May 20, 1969  K. L. HELLAND  3,445,160
COPYING APPARATUS
Filed April 7, 1966   Sheet 1 of 6
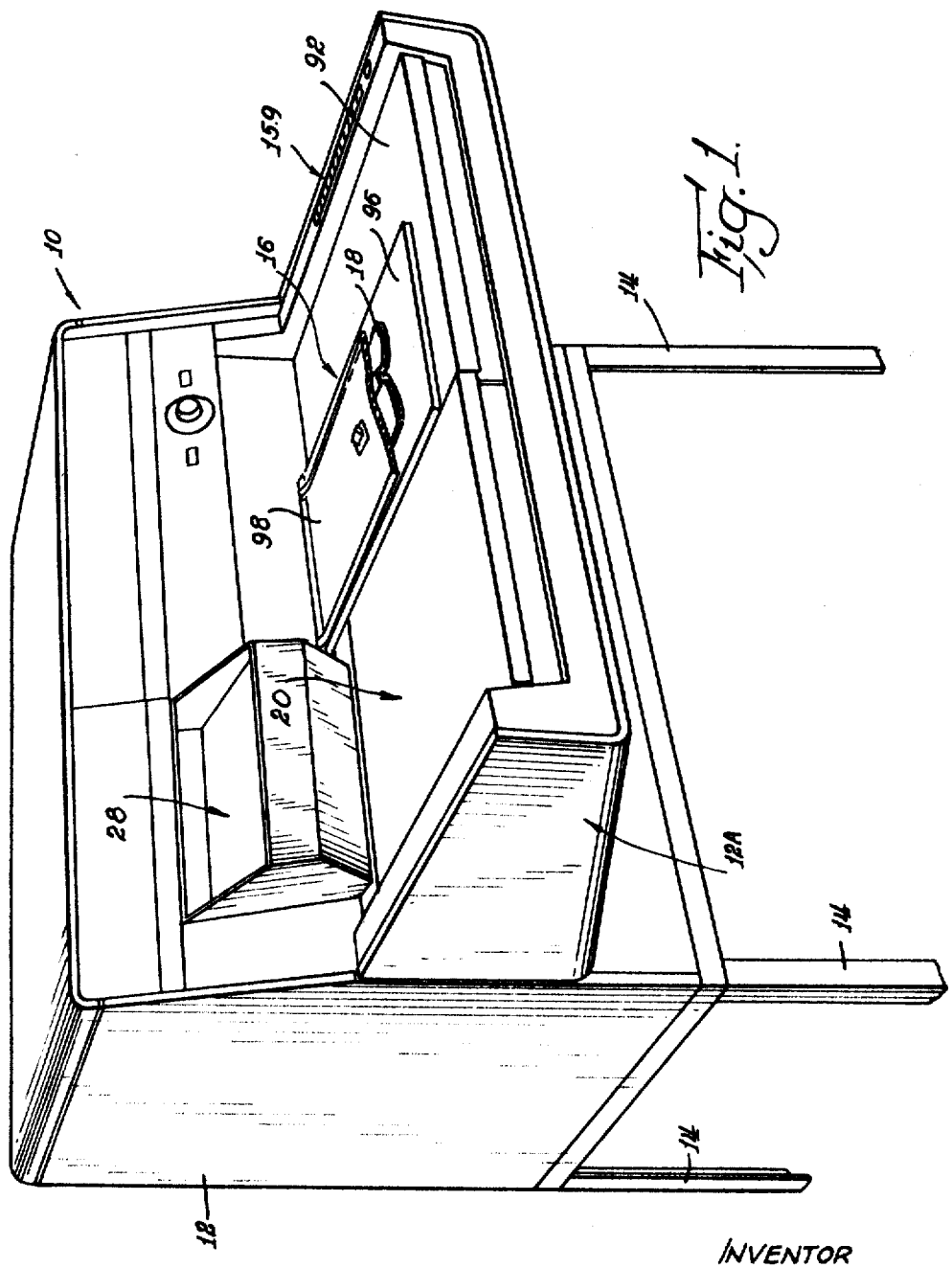
INVENTOR
KRISTIAN L. HELLAND
by
Mason, Kolehmainen, Rathburn and Wyss
ATTORNEYS

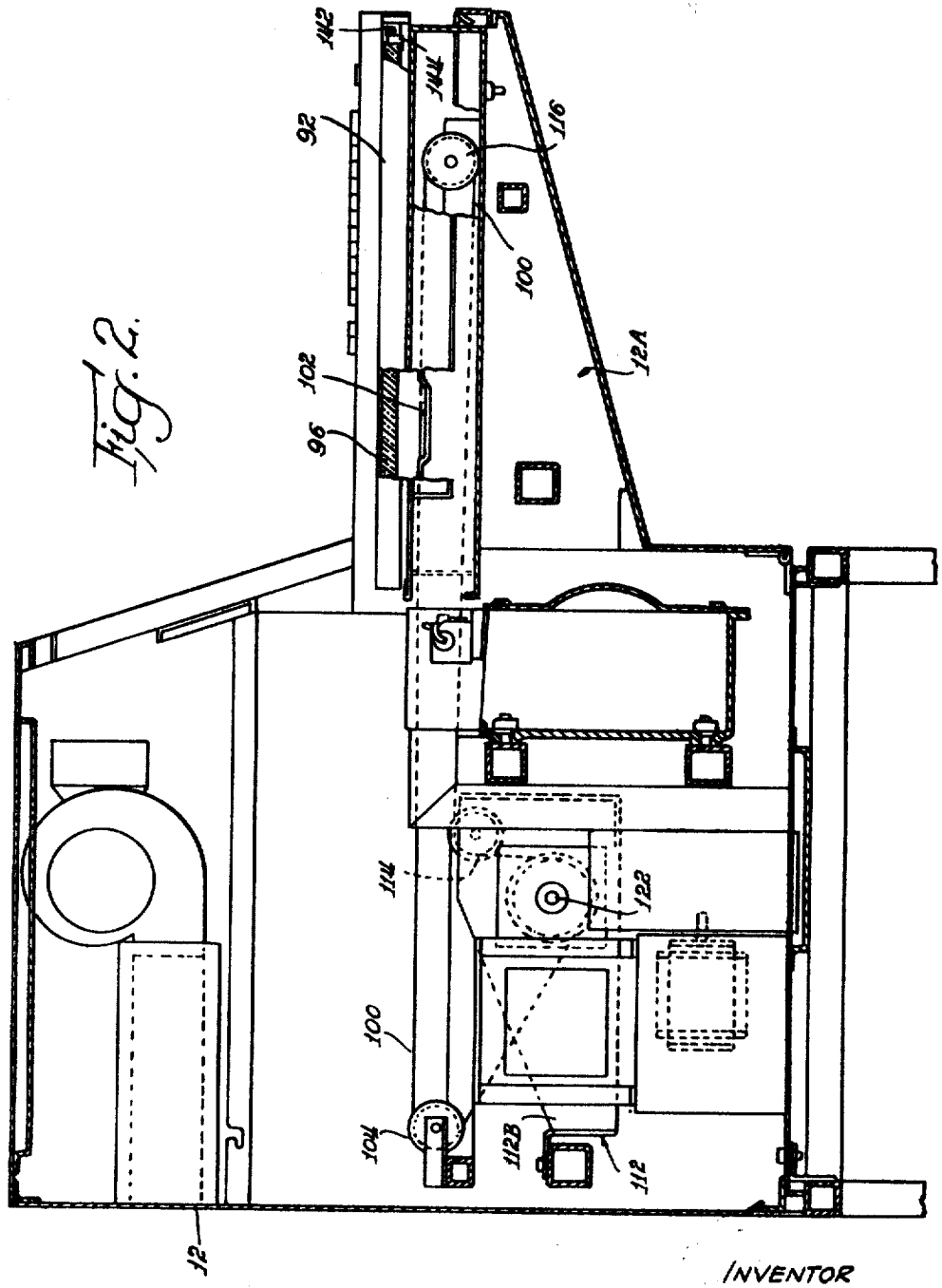

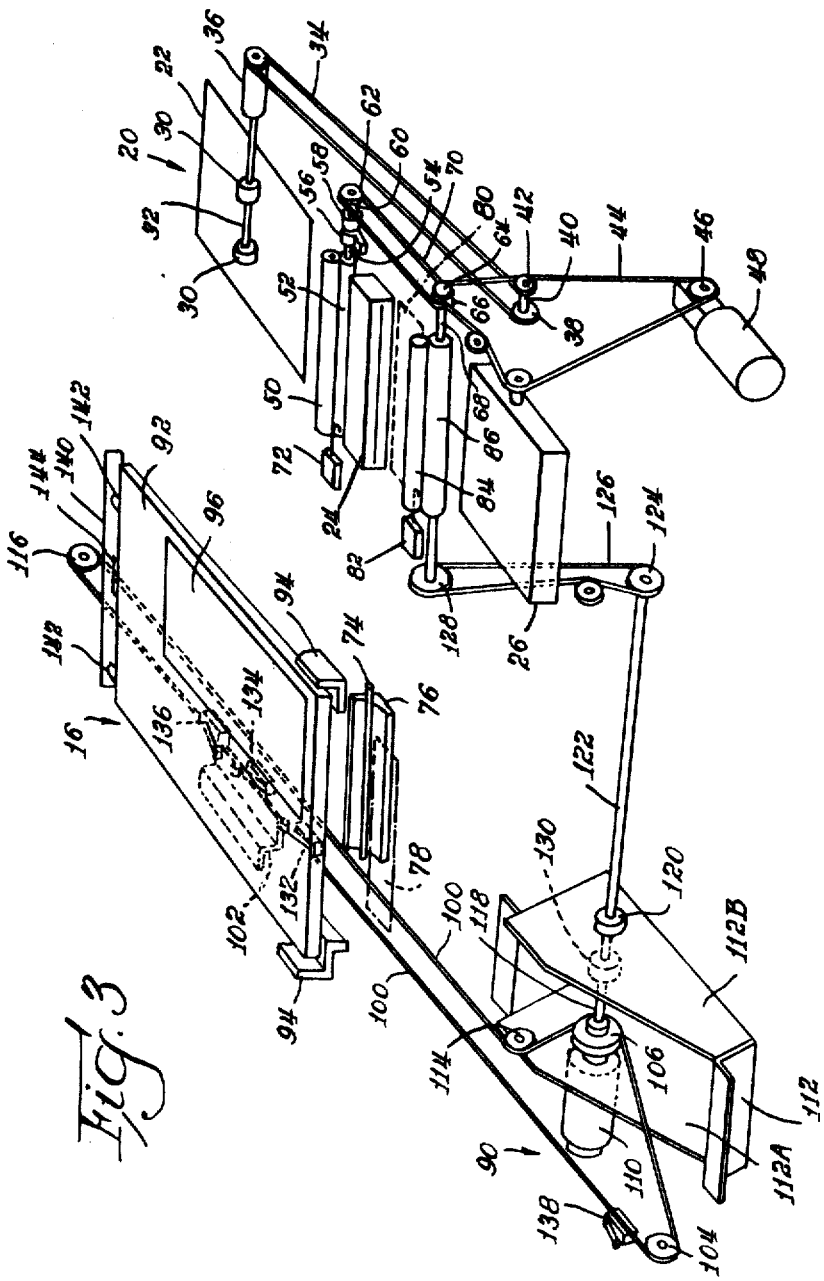

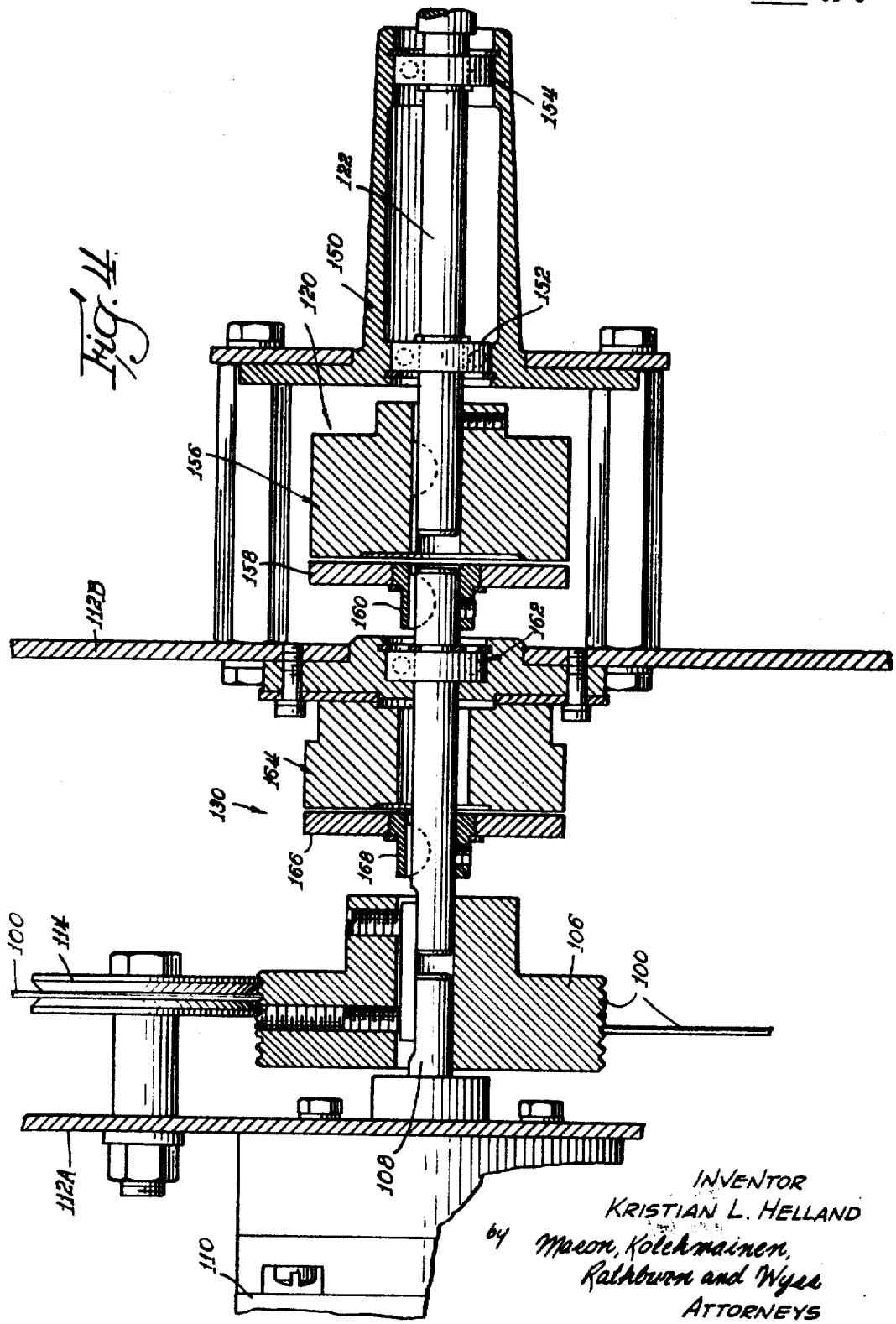

United States Patent Office 3,445,160
Patented May 20, 1969

3,445,160
COPYING APPARATUS
Kristian L. Helland, Schaumberg, Ill., assignor to Addressograph-Multigraph Corporation, Mount Prospect, Ill., a corporation of Delaware
Filed Apr. 7, 1966, Ser. No. 540,977
Int. Cl. G03g 15/04, 15/00
U.S. Cl. 355—11
15 Claims

ABSTRACT OF THE DISCLOSURE

A photoelectrostatic copying machine includes an original supporting table which is reciprocated past an illuminating station to produce a light image of the original which is directed on a uniformly charged surface of a copy sheet at an exposing station. The exposed copy sheet is then developed and discharged from the machine. Switches controlled by the position of the table and by the copy sheets control or synchronize a number of machine operations including the feeding of copy sheets, the illumination of the original, and the provision of forward and reverse drives for the table.

---

This invention relates to a photoelectrostatic copying machine and, more particularly, to such a machine including new and improved means for selectively exposing a sensitized member in accordance with a graphic original.

One type of known xerographic or photoelectrostatic copying machine selectively exposes a charged member by moving the original through the machine in synchronism with movement of the charged member. This type of machine can be used only with a flexible original, such as sheet material, which can be flexed to permit its feeding through the machine over a path frequently including curved sections. In other known machines adapted for use with inflexible or bulky graphic originals, the original is maintained in a fixed position on an exposure table, and the light image for selectively exposing the charged member is developed either by full frame exposure or by scanning the original with a movable light source. The use of full frame exposure and movable scanning light sources tends to increase the size of the machine or to require optical compensations which are disadvantages in certain applications.

Accordingly, one object of the present invention is to provide a new and improved photoelectrostatic copying machine.

Another object is to provide a photoelectrostatic copying machine in which a light image of even bulky or inflexible graphic originals can be developed by moving the original relative to the scanning or optical system.

Another object is to provide a photoelectrostatic copying machine in which a charged member is moved in a synchronized relation with the reciprocation of an original supporting frame past an illuminating or scanning area.

A further object is to provide a photoelectrostatic copying machine including new and improved means for effectively controlling the reciprocating movement of an original supporting frame.

A further object is to provide a photoelectrostatic copying machine having an exposure system spaced generally parallel to the illuminating and exposing areas, an original supporting frame horizontally reciprocable adjacent the illuminating area, and drive means for feeding the charged image receiving surface past the exposing area in synchronism with the reciprocation of the frame.

Another object is to provide a new and improved method of making copies in which the original is reciprocated over a fixed path.

In accordance with these and many other objects, an embodiment of the invention comprises a photoelectrostatic copying machine having a housing containing an exposing system with an illuminating area at which a graphic original is illuminated to provide a reflected light image that is directed to impinge on a charged photoelectrostatic member at an exposing area. The member, which can comprise a sheet of copy paper, is fed from a supply thereof through a charging station at which a uniform electrostatic charge is imparted to one or both of its surfaces. This sheet is then fed in synchronism with the movement of the graphic original to be copied past the exposure area at which the light image selectively discharges the charged surface to define a latent electrostatic image. The sheet is then transported through a developer station in which the electrostatic image is converted to a loose powder image and is then forwarded through a fuser unit in which the powder image is placed in a permanent form. The copy sheet is then discharged from the machine.

In accordance with the present invention, the assembly for scanning and selectively illuminating the graphic original comprises a supporting frame, platen, or table normally disposed outside the machine housing. This table is mounted for reciprocating and generally horizontal movement on the housing in a direction generally parallel to the illuminating area. The original supporting frame or table is coupled to drive means for the copy sheet during movement in a scanning direction and is driven in a reverse direction for return to its normal position by a separate drive means independent of the drive means for the copy sheet. A plurality of switches disposed along the path of movement are actuated in accordance with the position of the supporting frame to synchronize the movement of the frame with the operation of the copying machine. A control circuit actuated at least in part by these switches controls the various drive means to insure movement of the copy sheet and the frame to aligned positions relative to the illuminating and exposing areas to thereafter insure synchronized movement of the frame and the copy sheet during the selective exposure of the copy sheet.

Many other objects and advantages of the present invention will become apparent from considering the following detailed description in conjunction with the drawings in which:

FIG. 1 is a perspective view of a copying machine embodying the present invention;

FIG. 2 is a sectional view through the copying machine illustrating a shiftable original supporting frame and drive means therefor;

FIG. 3 is a schematic drawing illustrating the drive system for moving the original supporting frame and a copy sheet in a synchronized relation with each other;

FIG. 4 is an enlarged sectional view of a drive assembly for the original supporting frame or table.

Figure 5A:
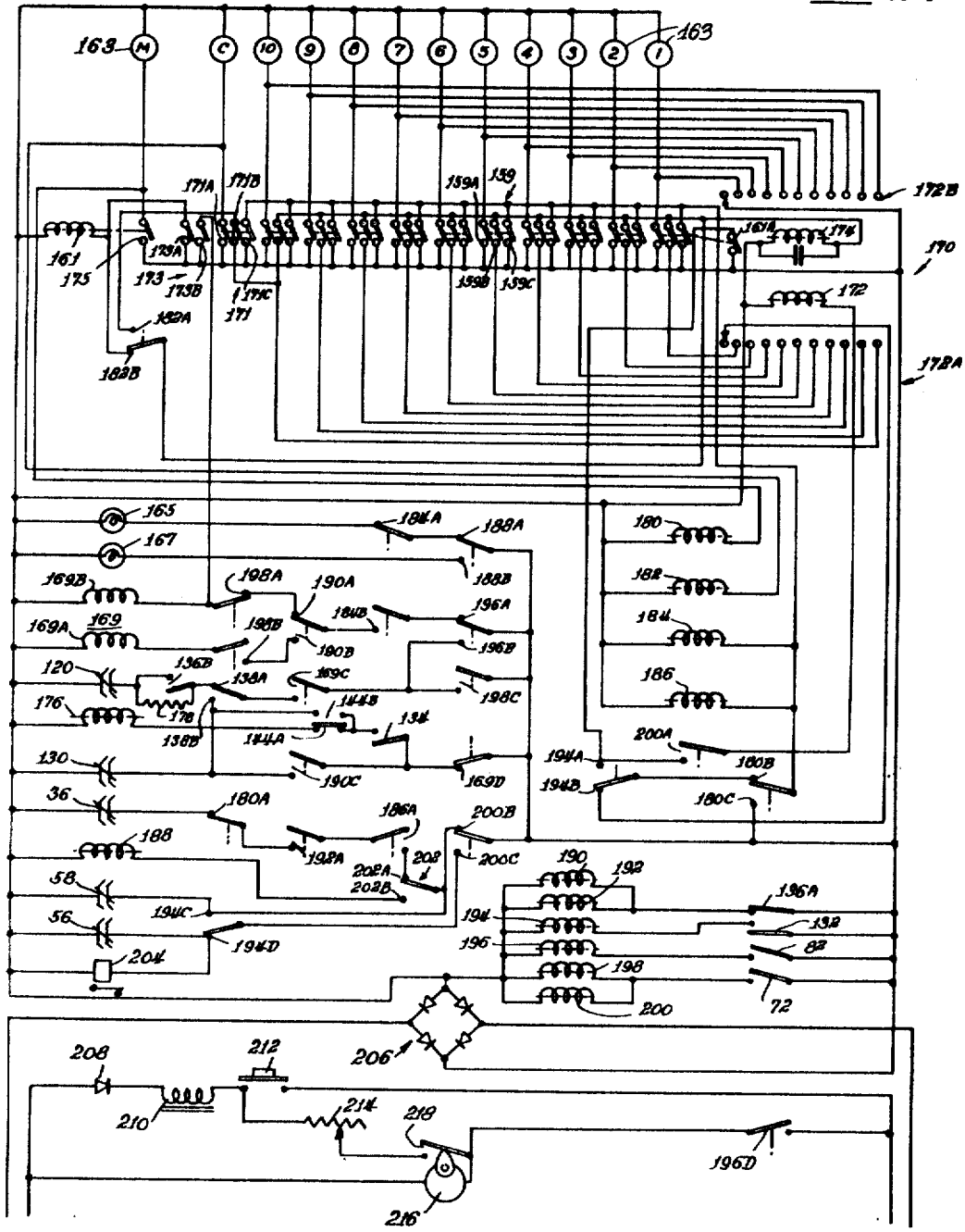
FIGS. 5A and 5B, when positioned one above the other, form a schematic circuit diagram of a control circuit for controlling the operation of the copying machine.

Referring now more specifically to FIGS. 1–3 of the drawings, therein is illustrated a copy making machine 10 which embodies the present invention and which includes a housing 12 supported on a plurality of floor engaging legs 14. The housing 12 includes a forwardly extending table or shelf portion 12A having on its right side (FIG. 1) a slidably mounted assembly 16 for receiving a graphic original 18 such as a book from which a copy is to be made. The assembly 16 is reciprocated into and out of the housing 12 to permit the graphic original 18 to be scanned to develop a corresponding light image. The left side of the table or shelf portion 12A of the housing 12 and the aligned portion of the housing 12 include a copy sheet feeding assembly 20 which feeds a photoelectrostatic copy sheet 22 (FIG. 3) in synchronism with the moving original 18 through a charging station 24 to receive a uniform electrostatic charge. This sheet is then moved past an exposing area in synchronism with the movement of the original 18 so that the charged surface is selectively discharged in accordance with the light image developed by scanning the original, thereby producing a latent electrostatic image. The copy sheet 22 is then fed through a developer station 26 in which the latent image is developed into a powder image, and subsequent movement of the copy sheet 22 carries this sheet into a fixing or fusing station in which the loose powder image is placed in permanent form. A completed copy is discharged into a copy receiving tray or receptacle 28 (FIG. 1) disposed at the front of the housing 12 above the sheet feeding assembly 20.

The units including the sheet feeding assembly 20, the corona charging assembly 24, the developer station or assembly 26, the fixing station (not shown), as well as the various means for transporting the copy sheet 22 are substantially identical to the similar components shown and described in detail in the copending application of John L. Tregay et al., Ser. No. 389,037, filed Aug. 12, 1964, which application is assigned to the same assignee as the present application. Accordingly, these portions of the copying machine 10 are shown in schematic form, and their construction and operation is described only to the extent necessary to an understanding of the present invention. More specifically, the assembly 20 includes a receptacle or tray containing a stack of photoelectrostatic copy sheets 22 (FIG. 3). A pair of drive rollers 30 secured to a shaft 32 rest on the uppermost copy sheet 22 to provide means for feeding a single copy sheet 22 from the assembly 20 into the copying machine 10. One end of the shaft 32 is coupled to a drive belt 34 through an electrically controlled clutch 36. The drive belt or chain 34 passes around a drive pulley or sprocket 38 connected by a shaft 40 to a pulley or sprocket 42 which is rotated by a drive chain or belt 44 passing around a drive pulley or sprocket 46 which is driven by a main drive motor 48 for the machine 10.

Accordingly, whenever the clutch 36 is rendered effective to couple the shaft 32 to the drive belt 34, the sheet engaging rollers 30 advance the uppermost copy sheet 22 toward the nip between a pair of feed rollers 50 and 52. The roller 50 is biased against the roller 52 which is secured to a shaft 54. A combined clutch-brake unit including an electricaly controllable brake 56 and electrically controlled clutch 58 selectively controls rotation of the shaft 54. Energization of the brake unit 56 arrests rotation of the shaft 54. Energization of the clutch unit 58 couples the shaft 54 to a shaft 60 connected to a gear or pulley 62 that is continuously rotated by the main drive motor 48 through the belt or chain 44, a pair of pulleys 64 and 66 secured to one end of a shaft 68, and a drive belt or chain 70. The brake 56 is released, and the clutch 58 is energized when the rollers 30 feed the leading edge of the copy sheet 22 into the nip between the rollers 50 and 52. The rotating rollers 50 and 52 advance the leading edge of the copy sheet 22 through the nip toward the charging station 24 so that the leading edge of the copy sheet 22 engages and actuates a control switch 72. The operation of the switch 72 releases the clutch 36 to terminate rotation of the feed rollers 30, energizes the brake 56 to stop movement of the shaft 54, and releases the clutch 58 to interrupt the driving connection between the shafts 54 and 60. The copy sheet remains in this position until the assembly 16 moves the original 18 to a proper position relative to an exposing assembly or system.

The exposing assembly or system is substantially identical to that shown in the above-identified disclosure and includes a line light source 74 disposed adjacent a reflector 76 to focus light on an illuminating area 78 disposed in the path of movement of the original 18 on the assembly 16. The light reflected from the original 18 is transmitted by an optical system including, for instance, reflective surfaces and lenses, to an exposing area 80. The areas 78 and 80 preferably are spaced apart and disposed in substantially parallel and horizontal planes. When movement of the assembly 16 places the original 18 at a predetermined position relative to the illuminating area 78, the brake 56 is released, and the clutch 58 is energized so that the rollers 50 and 52 feed the copy sheet 22 through the charging station 24 in which it receives a uniform electrostatic charge. As the leading edge of the sheet 22 leaves the charging station 24, an additional control switch 82 is actuated.

The copy sheet 22 now moves over the exposing area 80 in synchronized relation with movement of the original 18 past the illuminating area 78 so that the uniform electrostatic charge on the copy sheet 22 is dissipated in accordance with the received light image to provide an electrostatic image. The leading edge of the copy sheet 22 then passes into the nip between a pair of rollers 84 and 86 to be advanced to the developer station 26. The roller 86 is secured to the shaft 68 and is continuously rotated by the motor 48 through the belt 44 and the pulley 64. The rollers 84 and 86 advance the copy sheet 22 through the developer station 26 in which the electrostatic image is converted to the powder image. The sheet 22 is then conveyed to a fixing station (not shown) such as a heating means disclosed in the above-identified disclosure in which the loose powder image is placed in a permanent form. As the trailing edge of the copy sheet 22 passes beyond the switches 72 and 82, these switches are released. When the original 18 has been completely scanned, the assembly 16 is returned to its normal position.

Referring now more specifically to the original supporting and moving assembly 16, this assembly is moved by a drive means indicated generally as 90 (FIG. 3) to a position in which the original 18 is disposed adjacent the illuminating area 78, and the assembly is thereafter moved in synchronism with the movement of the copy sheet 22 past the exposing area 80 to develop a light image for selectively discharging the charged surface of the copy sheet 22. The assembly 16 includes a supporting table or frame 92 (FIGS. 1–3) which is slidably mounted on the housing 12 and the shelf portion 12A for generally horizontal reciprocating movement in a plane generally parallel to the illuminating area 78 and the exposing area 80. The table 92 is slidably supported by any suitable means such as a pair of guideways 94 (FIG. 3) carried on the housing 12. The frame 92 is apertured to receive a transparent member 96, commonly glass, normally covered by a flexible opaque cover member 98 (FIG. 1) that is pivotally mounted to the frame 92 along one edge or at one end of the glass pane 96. When an original 18 is to be copied, it is placed with the material to be copied facing downwardly toward the glass pane 96, and the flexible cover 98 is then placed over the original 18 as illustrated in FIG. 1.

The drive means 90 provides means for shifting the table or frame 92 relative to the illuminating area 78 and more particularly between a normal position illustrated in FIG. 3 and a displaced position disposed downwardly and to the left from the illustrated position. The drive means 90 includes a flexible connecting element, such as a wire 100, secured at one end to a bracket 102 that is secured to and depends from the lower surface of the frame 92. The wire 100 passes around a pulley 104 (FIGS. 2 and 3) secured to the housing 12, and several convolutions of the wire 100 pass around a pulley 106 which is provided with a helical groove and which is secured to one end of a shaft 108 (FIG. 4) of a return motor 110. The motor 110 is secured to a wall 112A of a supporting frame 112 carried on the housing 12. The wire 100 then passes around a pulley 114 carried on the wall 112A and an additional pulley 116 rotatably mounted on the projecting portion 12A of the housing 12 so that the other end of the wire 100 can be secured to a forward portion of the bracket 102. The direction of rotation of the motor 110 is such that the grooved pulley 106 rotates in a clockwise direction to move the table 92 from left to right in FIG. 3. This movement returns the table 92 from a displaced position, which can be different for different lengths of copy sheets 22, at a speed greater than the speed at which the table 92 is moved from right to left (FIG. 3) during scanning to reduce the cycle time necessary for each copy.

To provide means for moving the table 92 from right to left in FIG. 3 in synchronism with and preferably at the same speed as the copy sheet 22, the wire 100 is driven by the motor 48 which also actuates the drive system for the copy sheet 22. More specifically, a shaft 118 which is rigidly secured to the pulley 106 extends into an electrically controlled clutch assembly 120 in which terminates one end of a shaft 122. The other end of the shaft 122 carries a drive pulley 124 which is coupled by a belt 126 to a pulley 128 that is secured to one end of the shaft 68. As set forth above, the shaft 68 is driven by the motor 48 in synchronism with the rotation of the rollers 50, 52, 84, and 86. Thus, the shaft 122 is rotated in a counterclockwise direction in synchronism with the rotation of the feeding means for the copy sheet 22. When the clutch 120 is energized to couple the shaft 122 to the shaft 118, the pulley 106 is rotated in a counterclockwise direction, and the upper length of the wire 100 is moved from left to right to move the frame 92 in the same direction. The assembly 90 also includes an electrically controlled brake 130 which, when energized, arrests movement of the shaft 118 and thus stops rotation of the pulley 106 to stop the frame 92 in a predetermined position. The brake 130 is normally applied to lock the table 96 against movement. This is desirable because the positioning of articles to be copied, such as heavy books, on the table 96 might displace this table from its normal position.

To control the synchronized movement of the table 92 and the copy sheet 22, the machine 10 includes a plurality of switches actuated in dependence on the position of the table 92. More specifically, three switches 132, 134, and 136 are normally maintained in a closed or operated condition by engagement with the depending bracket 102 when the table 92 is in its normal position. The switches 136, 134, and 132 are released in this sequence as the table 92 moves from right to left and are operated in the reverse order when the table returns to a normal position moving from left to right. A normally open switch 138 is actuated if the table 92 moves too far to the left and provides a limit switch.

To prevent any possibility of injury to the operator during return movement of the table 92 to its normal position, the edge of this table positioned most closely to the operator, i.e., the forward edge of the table 92 (FIG. 1) is provided with a bumper of resilient material within which is disposed a bar or plate 140 (FIG. 3) slidably mounted on the table 92 by a pair of rods 142. The bar or operator 140 is resiliently biased to its outer position. If an obstruction is encountered during movement of the table 92, the bar 140 is depressed against the resilient bias and actuates a switch 144. This actuation of the switch 144 immediately arrests movement of the table 92.

FIG. 4 of the drawings illustrates the details of the drive assembly or drive means 90. The shaft 122 which is continuously rotated through the drive system actuated by the motor 48 is rotatably mounted on a wall 112B on the frame of the wall 112 by supporting structure 150 carrying a plurality of sets of bearings 152 and 154. The inner end of the shaft 122 is keyed to a combined winding and field structure 156 in the clutch assembly 120. The clutch assembly 120 also includes a generally circular magnetic plate 158 which is mounted on a sleeve 160 that is keyed to one end of the shaft 118. The shaft 118 is rotatably mounted on the wall 112B by a bearing assembly 162. When the winding in the assembly 156 is energized, the magnetic plate 158 is coupled to the field structure of the assembly 156, and the shafts 122 and 118 are coupled for rotation.

The brake assembly 130 includes a combined field structure and winding assembly 164 which is rigidly secured to the supporting wall 112B. This assembly also includes a generally circular and magnetic member 166 carried by a sleeve 168 that is keyed or otherwise secured to the shaft 118. The shaft 118, as set forth above, is rigidly secured to the pulley 106. Whenever the winding in the assembly 164 is energized, the field attracts the member 166 toward the field structure of the assembly 164 and thus couples the shaft 118 to the frame 112 and arrests rotation of the pulley 106.

Figure 5B:
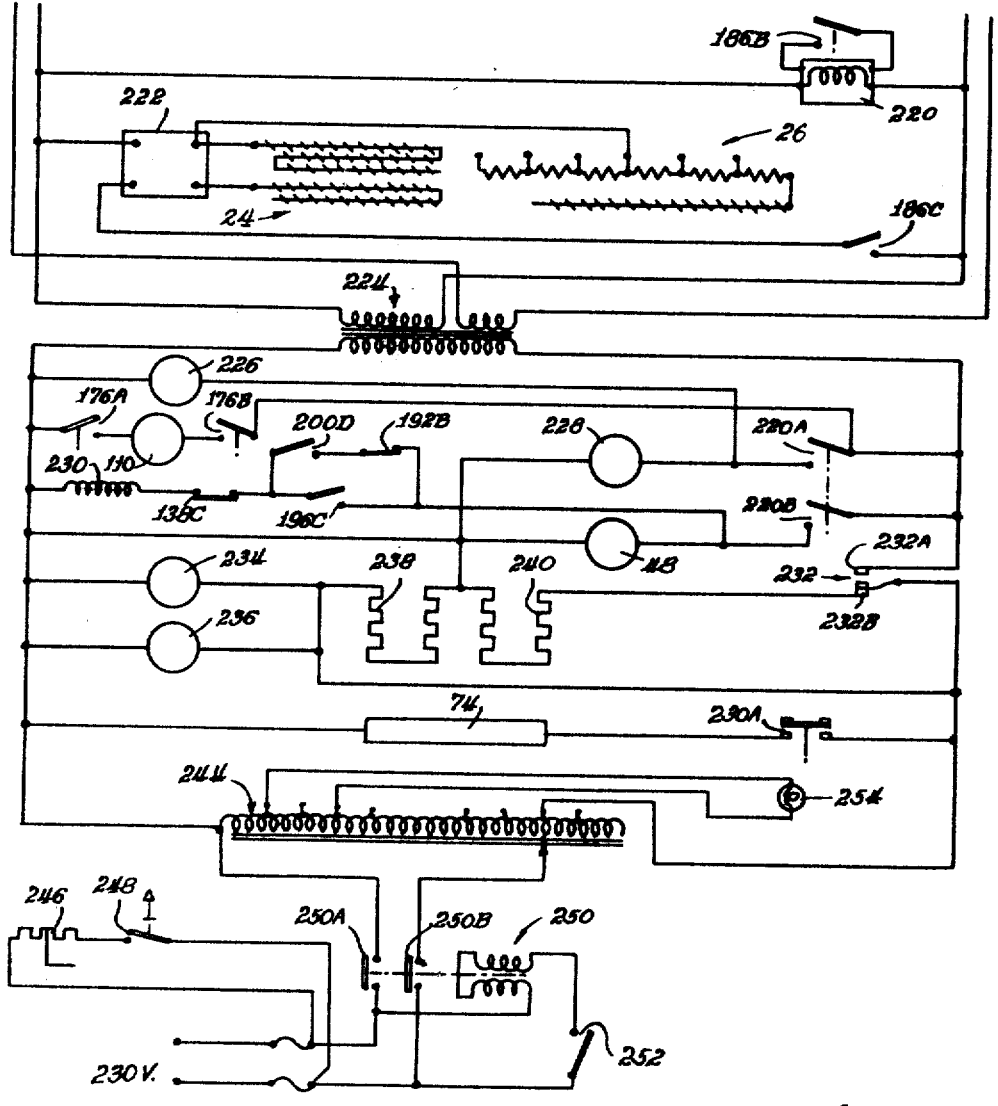

FIGS. 5A and 5B of the drawings illustrate a control circuit for controlling the operation of the machine 10. In the normal or off condition of the machine, a heater 246 (FIG. 5B) is intermittently connected across an alternating current input line by a humidity controlled switch 248. The heater 246 and the humidity switch 248 are disposed within the enclosure for the paper feeding assembly 20 and serve to maintain the copy sheets 22 at uniform humidity. The heater 246 and the switch 248 are effective to control the humidity within the enclosure for the copy sheets 22 independent of the on or off condition of the machine 10.

When the machine is to be placed in operation, a start switch 252 is closed so that the windings of a start relay 250 are energized to close two pairs of contacts 250A and 250B. The closure of these contacts energizes an input power transformer 244 to supply power to the machine 10. The energization of the input transformer or autotransformer causes the illumination of a lamp 254 to provide a visible indication of the on condition of the machine.

The application of power to the input transformer 244 energizes a pair of motors 234 and 236. The motor 234 drives a conveying mechanism (not shown) for conveying the copy sheets 22 containing the powder image through the fixing or fuser station. The motor 236 operates a blower for the fuser station. The application of power to the machine 10 also directly energizes a heater 238 and energizes an additional heater 240 through a temperature responsive switch 232 including a pair of normally closed contacts 232B. When the temperature at the fusing station reaches a predetermined level, the temperature responsive switch 232 opens the contacts 232B and closes a pair of normally open contacts 232A. The opening of the contacts 232B terminates the energization of the heater 240 so that only the heater 238 remains effective. The closure of the contacts 232A forwards alternating current power to a transformer 224 for supplying power to other parts of the control circuit.

One output of the transformer 224 is connected across a fullwave rectifier bridge 260 (FIG. 5A) so that direct current power is made available to an additional portion of the control circuit. As set forth above, the switches 132, 134, and 136 are normally maintained in an operated condition by the table 92 in its normal position, and these switches are shown in their operated condition. The switches 132 and 134 each includes a pair of contacts normally held in open condition, and the switch 136 includes a pair of normally open contacts 136B and a pair of normally closed contacts 136A. The closed contacts 136A complete an energizing circuit for the windings of two relays 190 and 192. When the relay 190 is operated, a pair of contacts 190A are opened to interrupt one part of an energizing circuit for one winding 169B of a mechanical latching relay 169, and a pair of contacts 190B are closed to prepare a portion of an operating circuit for a second winding 169A on the relay 169. The closure of a pair of contacts 190C when the relay 190 is operated energizes the winding of the brake assembly 130 so that the rotation of the pulley 106 is arrested. Thus, the frame or table 92 for the original 18 is braked or held in its normal home position. The closure of a pair of contacts 192A when the relay 192 is operated prepares an operating circuit for the clutch 36 which controls the feeding of copy sheets 22 into the machine 10 from the assembly 20, and the opening of a pair of contacts 192B interrupts a portion of one operating circuit for a lamp relay 230 that controls the energization of the lamp 74. The connection of power to the bridge 206 also illuminates a lamp 165 over a circuit including two pairs of normally closed contacts 184A and 188A to provide a visible indication that the machine 10 is prepared for selection of the number of copies to be produced.

The machine 10 includes a switch 202 which is operated to a position closing a pair of contacts 202A when an adequate supply of copy sheets 22 are in the assembly 20. Alternatively, when an insufficient supply of copy sheets is provided, the switch 202 is operated to a condition in which the contacts 202A are opened, and a pair of contacts 202B are closed. The closure of the contacts 202B completes an energizing circuit for the winding of a relay 188 over a circuit including a pair of normally closed contacts 200B to operate the relay 188. When this relay is operated, the cotnacts 188A are opened, and a pair of contacts 188B are closed. This terminates the illumination of the lamp 165 to provide a visible indication that the machine 10 is not ready for reproduction and completes a circuit for energizing a lamp 167 which provides a visible indication that the supply of copy sheets 22 has been depleted.

To prepare the machine for producing copies, the graphic original 18 is placed on the table 92 beneath the flexible cover 98 and overlying the transparent pane 96. The machine can then be conditioned for automatic reproduction of a desired number of copies by manually actuating one of a plurality of mechanically interlocked push buttons 159 (FIGS. 1 and 5A) carried on the right-hand portion of the projection 12A from the housing 12. Each of these push buttons contains an individual illuminating lamp 163 (FIG. 5A) and three normally open contacts 159A, 159B, and 159C. Assuming that the switch 159 representing five copies is depressed to prepare the machine 10 for automatically producing five copies of the original 18, the three pairs of contacts designated as 159A, 159B, and 159C in FIG. 5A of the drawings are closed. The closure of the contacts 159B connects a reset coil or solenoid 174 in a stepping switch 170 which counts the number of copies produced by the machine 10 to the fifth contact in a contact bank 172A in this counting switch, thereby preparing a circuit for restoring the switch 170 to a normal position. The closure of the contacts 159B also connects the fifth contact in the bank 172A to the winding of a push button reset solenoid 161 over a circuit including a pair of normally closed contacts 182B. When the solenoid 161 is energized, a detent mechanism for holding an operated one of the push buttons in an operated condition is released to restore all of the push buttons to a normal state. The clossure of the contacts 159A completes an obvious circuit for illuminating the lamp 163 associated with the "5" push button to provide a visible indication of the number of copies selected. The closure of the contacts 159C completes an energizing circuit for a pair of relays 184 and 186 as well as connecting one terminal of the bridge 206 over a circuit including a plurality of normally closed contacts 180B and 194B to the wiper of the contact bank 172A.

The operation of the relay 184 opens the contacts 184A to terminate the illumination of the lamp 165 and provide a visible indication that the copy selection has been made. The operation of the relay 184 also closes a pair of contacts 184B to prepare a portion of an operating circuit for the windings 169A and 169B on the latching relay 169. The operation of the relay 186 closes a pair of contacts 186B (FIG. 5B) in a time delay circuit associated with a relay 220 to operate this relay and to provide the time delay interval described in detail in the above-identified disclosure. The operation of the relay 220 closes a plurality of contacts 220A and 220B (FIG. 5B). The closure of these contacts completes an obvious energizing circuit for the main drive motor 48 and for two additional motors 226 and 228. The motor 226 operates a blower used in feeding copy sheets from a developer station 224 to the fusing station. The blower 228 provides a blower for cooling the lamp 74. The energization of the main drive motor 48 places the drive system and drive means operated by this motor in operation.

The operation of the relay 186 also closes a pair of contacts 186C (FIG. 5B) so that a power supply 222 is rendered effective to energize corona discharge wires at the charging station 24 and an additional corona discharge wire providing developer bias in the developer station 26. The closure of the contacts 186A upon operation of the relay 186 completes an energizing circuit for the feeder clutch 36 extending through the closed contacts 180A, 192A, 186A, 202A, and 200B. Since this circuit includes the contacts 192A closed by the relay 192 when the table 92 is in its normal position, the operation of the machine 10 cannot be initiated when the table 92 is away from its normal position. The energization of the clutch 36 renders the feeder wheels 30 (FIG. 3) effective to advance a copy sheet 22 into the nip between the rollers 50 and 52. The clutch 58 for driving the rollers 50, 52 is now energized over a circuit including the closed contacts 200B so that these rollers receive the leading edge of the copy sheet fed by the rollers 30 and advances it to a position disposed adjacent the corona discharge unit 24 to actuate the switch 72. The actuation of the switch 72 indicates that a copy sheet 22 is in position for a copying operation.

The closure of the switch 72 completes an energizing circuit for the windings of two relays 198 and 200. When the relay 200 operates, two pairs of contacts 200A and 200C are closed, and the contacts 200B are opened. The closure of the contacts 200A prepares a circuit for energizing the motor magnet 172 for the stepping switch 170. The opening of the contacts 200B interrupts the above-described circuits for the clutch windings 36 and 58 so that the feeder wheels 30 no longer advance the copy sheet and the rollers 50 and 52 are no longer rotated. This stops the copy sheet 22 in a predetermined position approaching the entry to the corona charging unit 24. The closure of the contacts 200C completes a circuit over a pair of normally closed contacts 194D for energizing the brake 56 to arrest rotation of the shaft 54 and that of the rollers 50 and 52 with the copy sheet 22 in the desired position. The closure of the contacts 200C also operates a solenoid in a mechanical counter 204 which provides a running total of the number of copies produced by the machine 10. The closure of the contacts 200D prepares a circuit including the closed contacts 220B and a pair of contacts 138C on the limit switch 138 for operating a lamp relay 230, which circuit is interrupted at the open contacts 192B.

The operation of the relay 198 opens the contacts 198A and closes a plurality of contacts 198B and 198C. The opening of the contacts 198A interrupts another point in the circuit for the winding 169B of the latching relay 169, and the closure of the contacts 198B completes an energizing circuit including the closed contacts 196A, 184B, 190B, and 198B for energizing the winding 169A of the latching relay 169. This operation of the relay 169 closes a pair of contacts 169C and opens a pair of contacts 169D. The opening of the contacts 169D interrupts a circuit for energizing the brake 130 for the pulley 106 so that this pulley is now freed for rotation. The closure of the contacts 169C completes a circuit including the closed contacts 198C, 138A, and a series connected resistance element 178 for energizing the clutch 120. The low level energization of the clutch 120 resulting from the series resistor 178 provides a slipping coupling between the shaft 122 and the shaft 118 so that the pulley 106 is slowly rotated in a counterclockwise direction to slowly advance the table 92 to bring the leading edge of the original 18 to a position adjacent the illuminating area 78.

As the table 92 moves away from its normal position, the switch 136 is restored to its normal condition. In doing so, the contacts 136A are opened to interrupt the operating circuit for the relays 190 and 192, and the contacts 136B are closed to provide a shunt around the series resistance 178. This provides full energization of the winding in the clutch 120 and increases the speed at which the table 92 is driven. The full or complete clutching of the shaft 122 to the shaft 118 insures that the table 92 moves the original 18 past the illuminating area 78 in a synchronized relation with the movement of the copy sheet 22 past the exposing area 80 under the control of the drive system actuated by the motor 48.

The release of the relay 190 closes the contacts 190A and opens the contacts 190B and 190C. The opening of the contacts 190B interrupts the above-described energizing circuit for the winding 169A of the latching relay 169. Since this relay is latched in either of its two alternate conditions, the contacts 169C remain closed, and the contacts 169B remain opened. The closure of the contacts 190A prepares a circuit for energizing the winding 169B of the relay 169, but this energizing circuit is interrupted at the open contacts 198A. The opening of the contacts 190C interrupts an additional point in the energizing circuit for the winding of the brake 130.

When the relay 192 is released, the contacts 192A are opened, and the contacts 192B are closed. The opening of the contacts 192A interrupts an additional point in the circuit for energizing the winding of the feeder clutch 36. The closure of the contacts 192B coupled with the prior closure of the contacts 200D when the copy sheet is advanced to its ready position completes a circuit including the closed contacts 220B, 192B, 200D, and 138C for energizing the winding of a lamp relay 230. When the relay 230 is operated, a pair of contacts 230A are opened to energize the lamp 74. Thus, the lamp 74 is now illuminated to prepare the exposure system for operation.

As the table or frame 92 moves through its next increment of movement, the switch 134 is released to close the contacts 134. The closure of the contacts 134 prepares an operating circuit for a control relay 176 which controls the energization of the return drive motor 110. However, this circuit is interrupted at the open contacts 169B.

As the table or original supporting frame 92 approaches the illuminating area 78, the switch 132 is released to close a pair of normally open contacts which energize the winding of a relay 194. When the relay 194 is operated, the contacts 194B are opened to interrupt the connection to the wiper for the switch bank 172A, and a pair of contacts 194A are closed to provide an energizing circuit for the motor magnet 172. The switch 170 is an indirect drive switch and is spring advanced when the motor magnet 172 is released. A pair of contacts 161A are momentarily closed by operating any of the push buttons 159 and serve to hold the magnet 172 energized if the push buttons are operated to change the number of copies in an order after the machine 10 has been started. The operation of the relay 194 also opens the contacts 194D and closes a pair of contacts 194C. The opening of the contacts 194D releases the counter 204 and the brake 56, and the closure of the contacts 194C energizes the clutch 58 so that movement of the copy sheet 22 is initiated.

The rotation of the drive rolls 50 and 52 now advances the leading portion of the copy sheet through the charging station 24 in which one or both surfaces receive a uniform electrostatic charge. When the charge sheet leaves the charging station 24 and passes over the exposure area 80, the switch 82 is operated to complete an energizing circuit for a winding of a relay 196. When the relay 196 is operated, the contacts 196A are opened to interrupt an additional point in the energizing circuit for the winding 169A of the relay 169. The closure of a pair of contacts 196B when the relay 196 operates completes an alternative circuit for maintaining the energization of the clutch 120. The closure of the contacts 196C (FIG. 5B) completes an alternative circuit including the closed contacts 220B and 138C for maintaining the energization of the winding of the lamp relay 230. The closure of the contacts 196D energizes a motor 216 driving a cam which periodically closes a pair of contacts 218. This energizes a vibrator winding 210 through a potentiometer 214 and a rectifier 208. The vibrator winding 210 forms a portion of a toner dispenser and is periodically energized under the control of the timer motor 216 to dispense additional toner to the developer station 26 in dependence on the linear length of copy sheets 22 fed through the machine 10. A push button 212 provides an alternate means for manually controlling the dispensing of toner.

The graphic original 18 on the table 92 and the copy sheet 22 are now advanced past the illuminating area 78 and the exposing area 80 in synchronism with each other by means of the drive system actuated by the motor 48. As the trailing edge of the copy sheet 22 passes beyond the switch 72, this switch is released to release the relays 198 and 200. The release of the relays 198 and 200 restores the contacts controlled thereby to their normal condition, and, in doing so, prepares the control circuit for the next copying operation. When the relay 200 releases to open the contacts 200A, the energizing circuit for the motor magnet 172 is interrupted, and the switch 170 releases to advance the wipers in the contact banks 172A and 172B a single step from their normal home position to a first position representing the first copy produced by the machine 10. Since the push button switching assembly 159 representing five copies has been actuated, this movement of the wiper in the switch bank 172A does not produce any useful function. However, the wiper in the bank 172B completes an obvious circuit for energizing the lamp 163 representing a single copy. Thus, the push button "1" is illuminated to provide a visible indication that the first copy of the five copies requested has been produced.

As the trailing edge of the copy sheet 22 passes beyond the charging station 24, thus indicating that the original 18 has been moved past the illuminating area 78 and that the copy sheet 22 has been fully exposed at the exposing area 80, the switch 82 is released to interrupt the operating circuit for the relay 196. This releases the relay 196 and prepares the machine 10 for returning the table 92 to its normal position and for continuing the feeding of the exposed copy sheet 22 through the machine to be ejected into the copy receiving receptacle or tray 28. The switch 82 is released at different times in dependence on the length of the copy sheet 22. Thus, the return of the table 92 to its normal position is started at different points in its forward or scanning movement in dependence on the length of the copy sheet 22, or, indirectly, on the length of the original to be copied. The control exercised by the release of the switch 82 could also be exerted by switches actuated by movement of the table 92 to different positions corresponding to the different lengths of the copy sheets 22.

When the relay 196 is released, the opening of the contacts 196C (FIG. 5B) interrupts the operating circuit for the lamp relay 230 so that this relay releases to open the contacts 230A. This terminates the illumination of the lamp. The opening of the contacts 196B, the contacts 198C having been previously opened, interrupts the energizing circuit for the winding in the clutch assembly 120 so that the shaft 118 is no longer clutched to the shaft 122. Thus, the table 92 is no longer driven in its forward direction by the drive system actuated by the motor 48. The closure of the contacts 196A completes a circuit for energizing the winding 169B of the latching relay 169, this circuit extending through the closed contacts 196A, 184B, 190A, and 198A.

When the winding 169B of the latching relay 169 is actuated, the contacts 169C are opened, and the contacts 169D are closed. The opening of the contacts 169C interrupts an additional point in the previously interrupted circuit for the winding in the clutch assembly 120. The closure of the contacts 169D completes a circuit extending through the closed switch 134, and the closed contacts 144A on the safety switch 144 for energizing the winding of the relay 176. On operating, the relay 176 closes two pairs of normally open contacts 176A and 176B (FIG. 5B) to complete an energizing circuit for the return motor 110. When the motor 110 is energized, the pulley 106 is rotated in a clockwise direction, and the table 92 moves from left to right (FIG. 3) to return the table toward its normal position. During this interval, the copy sheet 22 continues to move through the machine 10 to complete the development of the electrostatic image and the fixing of the powder image.

As the table 92 moves toward its normal home position, the switch 132 is first opened to interrupt the energizing circuit for the relay 194 so that this relay releases and restores its contacts to their normal positions and conditions the control circuit for another cycle of operation. The switch 134 is next opened to interrupt the above-described energizing circuit for the winding of the relay 176 and this relay is released to open the contacts 176A and 176B and to terminate operation of the return motor 110.

When the table 92 reaches its home position, the switch 136 is operated to close the contacts 136A and to open the contacts 136B. The opening of the contacts 136B removes the shunt around the resistance 178 in the interrupted circuit for energizing the winding in the clutch 120. The closure of the contacts 136A again operates the relays 190 and 192 so that the contacts controlled thereby are moved to their actuated positions. The closure of the contacts 190C energizes the winding in the brake assembly 130 so that rotation of the shaft 118 and of the drive pulley 106 is damped so that the table 92 comes to a stop. The opening of the contacts 190A interrupts the energizing circuit for the winding 169B. However, the contacts 169C remain open and the contacts 169D closed because of the mechanical latching arrangement embodied in the relay 169. The closure of the contacts 192A once again completes the circuit for the winding in the clutch 36 so that the rollers 30 feed the next copy 22 in the assembly 20 toward the nip between the rotary rollers 50 and 52.

When the copy sheet 22 being fed by the roller 30 reaches the nip between the rollers 50, 52 and is advanced to its ready position in which its leading edge engages and operates the switch 72, the relays 198 and 200 are again operated. The control circuit controls the production of the second copy of the original 18 by reciprocating the platform 92 in synchronism with feeding the selected copy 22 in the manner described above during which the stepping switch 170 is advanced so that the wipers in the banks 172A and 172B are advanced to their second positions, thus terminating illustration of the "1" lamp 163 and illuminating the "2" lamp 163 to indicate the production of the second copy.

This operation continues until such time as, during the production of the fifth copy, the trailing edge of the fifth copy sheet 22 passes beyond the switch 72 so that this switch is released to release the relays 198 and 200. In releasing the relay 200, the contacts 200A are again opened to release the motor magnet 172. At this time, the wipers in the banks 172A and 172B advance to their fifth position. The wiper in the bank 172B energizes the fifth lamp 163 which has been energized through the closed contacts 159A on the "5" push button 159. The lighting of only the fifth lamp 163 indicates the completion of the requested number of copies. The wiper in the bank 172A prepares a circuit for resetting the push buttons and the stepping switch 170.

More specifically, with the wiper in the bank 172A in engagement with its fifth contact, the winding of the solenoid 161 and the winding of the reset magnet 174 are connected through the closed contacts 159B in the fifth push button 159 over the wiper in the bank 172A to the open contacts 194B on the relay 194. When the table 92 moves toward its normal position, the switch 132 is again operated to interrupt the operating circuit for the relay 194, and this relay releases to close the contacts 194B. This further connects the windings of the reset solenoid 161 and the reset magnet 174 over the closed contacts 180B and the closed contacts 159C on the operated push button 159 to the bridge 206. When the solenoid 174 is energized, the wipers in the switch banks 172A and 172B are restored to their normal condition, which, in turn interrupts the above-described circuit for energizing the solenoids 161 and 174. The energization of the solenoid 161 releases the mechanical interlock for the copy selecting push buttons so that the contacts 159A, 159B, and 159C for the selected push button 159 are all released to restore the copy selecting mechanism to its normal condition.

These operations terminate the illumination of the "5" lamp 163 and release the relays 184 and 186. The release of the relay 186 opens the contacts 186A to prevent the energization of the clutch 36 and the feeding of an additional copy sheet 22 into the machine 10. The closure of the contacts 184A illuminates the lamp 165 to provide a visible indication that the machine 10 is ready for the next copy order. The opening of the contacts 186B starts the ninety second delay period so that this delay circuit associated with the relay 220 so that this relay releases to open the contacts 220A and 220B in the event that a copy order is not placed by actuating one of the push buttons 159 within the ninety second time interval. The release of the relay 220 terminates the energization of the motors 48, 228, and 226 until such time as their operation is required for the production of additional copies. The opening of the contacts 186C disables the power supply 222 (FIG. 5B) so that the corona bias and corona charging potentials are no longer supplied to the stations 24 and 26. The machine 10 remains in this condition until the next copy order is placed by actuating one of the ten push buttons 159.

As indicated above, the switch 144 provides a safety control to prevent return movement of the platform or table 92 if this return movement is, in any sense, obstructed. When the table 92 strikes an obstruction during return movement, the bar 140 actuates the switch 144 (FIG. 3) so that the normally closed contacts 144A (FIG. 5A) are opened and a pair of conacts 144B is closed. The opening of the contacts 144A interrupts the operating circuit for the relay 176 so that the contacts 176A and 176B are opened to terminate energization of the return drive motor 110. This stops the return drive for the table 92. The closure of the contacts 144B energizes the winding in the brake assembly 130 so that rotation of the shaft 118 and thus of the pulley 106 is immediately arrested. Whenever the obstruction to the return of the table or platform 92 is removed so that the switch 144 is released, the closure of the contacts 144A immediately reoperates the relay 176 to start the return motor 110, and the opening of the contacts 144B releases the brake 130. This emergency arresting of the table return drive does not affect the movement of the copy sheet 22 or the completion of the copy thereon.

As set forth above, the return movement of the frame 92 is normally initiated when the trailing edge of the copy sheet 22 passes the exposing area 80 so that the switch 82 is released to release the relay 196. However, if the paper becomes jammed in the machine or if a very long length of copy sheet 22 is fed into the machine, the switch 82 remains actuated beyond the time at which the table 92 reaches its displaced or left-hand (FIG. 3) position. If this occurs, the table 92 engages the operator for the limit switch 138 to operate this switch to open the contacts 138A and 138C and to close a pair of normally open contacts 138B. The opening of the contacts 138A terminates the energization of the winding in the clutch assembly 120 so that the shaft 118 and the drive pulley 106 are isolated from the rotating shaft 122, thus stopping forward movement of the frame 92. The closure of the contacts 138B energizes the winding in the brake assembly 130 to arrest further forward movement of the table 92. The opening of the contacts 138C (FIG. 5B) releases the relay 230 to terminate the energization of the lamp 74 and prevents overheating. When the jam is cleared or when the end of the copy sheet 22 passes beyond the switch 82 to release this switch, the table 92 is returned to its normal position in the manner described above, and the switch 138 is released to restore the contacts 138A, 138B, and 138C to their normal positions.

The machine can also be conditioned for manually feeding individual copy sheets 22 into the nip between the rollers 50 and 52 without using the assembly 20. More specifically, by manually actuating a switch or push button 175, a circuit is completed for operating a manual control relay 180 which prepares the machine 10 for a manual operation. When the relay 180 is operated, the contacts 180A are opened to disable the circuit for energizing the clutch 36 for the feeding assembly 20. The operation of the relay 180 also opens the contacts 180B and closes a pair of contacts 180C. The closure of the contacts 180C completes an operating circuit for the relays 184 and 186 which are normally operated under the control of one of the ten push buttons 159. The opening of the contacts 180B opens a point in the circuit described above for pulsing the motor magnet 172. Thus, the stepping switch 170 is not actuated during manual operation. The machine 10 can now be operated by manually feeding the copy sheets 22 between the nip between the rollers 50 and 52 to control the actuation of the switch 72. Thereafter, continued feeding of the copy sheet 22 and the operation of the machine 10 is similar to that described above for automatic operation. A lamp 163 also is energized by the closed contacts of the manual push button 175 to provide a visible indication that the machine 10 is conditioned for manual operation.

The machine 10 can be restored to normal automatic operation by actuating a momentary reset push button or switch 173 including two pairs of normally open contacts 173A and 173B which are not coupled to the release solenoid 161. The closure of the contacts 173A energizes the solenoid 161 to release the closed contacts 175. The opening of the contacts 175 terminates the energization of the "manual" indicating lamp 163 and releases the relay 180. The release of the relay 180 releases the relays 184 and 186 and returns control over the clutch 36 to the control circuit.

The closure of the contacts 173A is also effective over a circuit including the normally closed contacts 182B to energize the reset magnet 174 to insure that the counting switch 170 is in its normal position. The closure of the contacts 173B energizes the winding 169B of the latching relay 169 to insure that the contacts 169C are opened and the contacts 169D closed. The closure of the contacts 169D insures that the brake assembly 130 is rendered effective whenever the platform or table 92 is in its normal position in which the contacts 190C of the relay 190 are closed. Thus, the machine 10 can be restored to its normal condition by momentarily actuating the reset switch 173.

To condition the machine 10 for continuous operation, a continuous operation push button 171 is actuated to close three pairs of contacts 171A, 171B, and 171C, which contacts are latched in a closed condition. The closure of the contacts 171A energizes a lamp 163 to provide a visible indication that the machine is in condition for continuous operation. The closure of the contacts 171A also completes an operating circuit for a relay 182 which operates to open the contacts 182B and to close a pair of contacts 182A. The opening of the contacts 182B interrupts the circuit for energizing the release solenoid 161 under the control of the setting of the stepping switch 170.

The closure of the contacts 182A connects the reset magnet 174 of the stepping switch 170 to the closed contacts 171B in the continuous operation push button 171. These contacts are connected to the tenth contact in the bank 172A of the switch 170. The closure of the contacts 171C completes an operating circuit for the relays 184 and 186 to start the machine 10 as well as prepares a path over the contacts 180B and 194B for controlling the energization of the reset magnet 174 in dependence on the setting of the wiper in the contact bank 172A. Thus, the machine 10 now continuously produces copies by automatically feeding sheets 22 from the assembly 20 into the machine 10. Whenever the stepping switch 170 reaches its tenth setting, a circuit is completed from one side of the fullwave rectifier bridge 206 through the closed contacts 171C, 180B, 194B, the wiper in the contact bank 172A, and the closed contacts 171B and 182A for energizing the reset magnet 174. Thus, the stepping switch 170 is reset to a normal position after the production of each ten copies when the machine 10 is conditioned for continuous operation. The machine 10 is restored to a normal condition by momentarily operating the reset button 173 so that the solenoid 161 restores the contacts 171A, 171B, and 171C to a normal condition. Incident to this restoration operation, the relay 182 is released to open the contacts 182A and to close the contacts 182B.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. An apparatus for making multiple reproductions of an original on copy sheets with photoconductive surfaces which comprises a transparent platen means reciprocably movable over a scanning path from a normal position to a displaced position and over a return path between the displaced position and the normal position, feeding means for feeding a copy sheet over a path of movement, first sensing means for sensing the arrival of the lead edge of the copy sheet at a first point in its path of movement, second sensing means responsive to the position of the platen at a predetermined point in its scanning path, means controlled by the first and second sensing means for initiating timed related movement of the platen along its scanning path and of the copy sheet along its path of movement, charging means disposed adjacent the path of movement of the copy sheet for charging the copy sheet, illuminating means disposed adjacent the scanning path for illuminating a narrow segment of the platen extending transverse to the direction of movement of the platen along the scanning path to develop a light image of the original, means for exposing said charged copy sheet with the light image to provide a latent image, developing means for developing the latent image on the exposed sheet, third sensing means operated by the copy sheet for detecting the completion of the exposing of the copy sheet, drive means controlled by the third sensing means to return said platen to the normal position along the said return path, and means controlled by the second sensing means during movement of the platen along the return path for controlling the feeding means to feed another copy sheet.

2. A machine for making copies of originals on copy sheets of different length comprising copy sheet feeding means for feeding a copy sheet through the machine over a predetermined path of movement, copy sheet charging means disposed adjacent a point in the path for imparting a uniform charge to the copy sheet, copy sheet developing means disposed adjacent the path spaced from the charging means in the direction of movement of the copy sheet along the path for developing a charge image on the copy sheet, a copy sheet exposing assembly for converting the uniform charge on the copy sheet to a charge image in accordance with the original to be copied, said exposing assembly including an exposing area adjacent the path and located between the charging means and the developing means and an illuminating area spaced from the exposing area, a supporting means for receiving an original to be copied, means mounting the supporting means on the machine for substantially rectilinear reciprocating movement past the illuminating area, drive means coupled to the supporting means for moving the supporting means in opposite directions between normal and displaced positions, first control means operated when a copy is to be produced for placing the drive means in operation to move the supporting means in one direction away from the normal position toward a displaced position, sensing means disposed adjacent the path for determining when the copy sheet has been exposed, and second control means controlled by the sensing means and coupled to the drive means for controlling the drive means to reverse the direction of movement of the supporting means and start the return of the supporting means to its normal position when the sensing means determines that the copy sheet has passed the exposing area.

3. In an apparatus for making copies of originals on copy material, a copy handling assembly including copy material charging, exposing, and developing stations spaced along a path and copy material feeding means for feeding the copy material along the path, said exposing station including an exposing area, an illuminating station including a lamp and an illuminating area at which an original is illuminated by the lamp to provide a light image that is applied to the copy material at the exposing area, a table for receiving an original and mounted for reciprocating movement between normal and displaced positions to move the original past the illuminating area, drive means coupled to the table for reciprocating the table, a control circuit connected to the lamp and the drive means to place the drive means in operation to reciprocate the table and to illuminate the lamp to produce a light image from the original, and switch means actuated when the table moves beyond the displaced position in a direction away from the normal position, said switch means being connected to the control circuit to terminate the illumination of the lamp when the switch means is actuated.

4. In an apparatus for making copies of originals on copy material, a copy handling assembly including copy material charging, exposing, and developing stations spaced along a path and copy material feeding means for feeding the copy material along the path, said exposing station including an exposing area, an illuminating station including an illuminating area for illuminating an original and providing a light image that is applied to the copy material at the exposing area, a table for receiving an original and mounted for reciprocating movement between normal and displaced positions to move the original past the illuminating area, a plural speed drive means coupled to the table for reciprocating the table, a control circuit connected to the copy handling assembly and the drive means, said control circuit being operable to place the drive means in operation to move the table from the normal position at a first speed to move the original toward the illuminating area, said control circuit also placing the copy handling assembly in operation to produce a copy in accordance with a light image produced by the illuminating station, first switch means controlled in accordance with the position of the table and connected to the control circuit to prevent the control circuit from starting the production of a copy while the table is not in its normal position, and second switch means connected to the control circuit and operated when the original on the table is disposed adjacent the illuminating area for operating the control circuit to change the speed of the drive means from the first speed to a greater second speed to move the original past the illuminating area at substantially the same speed as the copy material is moved past the exposing area by the feeding means.

5. In an apparatus for making copies of originals on copy material, a copy handling assembly including copy material charging, exposing, and developing stations spaced along a path and copy material feeding means for feeding the copy material along the path, said exposing station including an exposing area past which the copy material is moved by the feeding means at a given speed, an illuminating station including an illuminating area for illuminating an original and providing a light image that is applied to the copy material at the exposing area, a table for receiving an original and mounted for reciprocating movement between normal and displaced positions to move the original past the illuminating area, drive means coupled to the table for reciprocating the table, and control means connected to the drive means and operable to place the drive means in operation to move the table at a first speed less than the given speed until the original is disposed adjacent the illuminating area and to then move the table at a second speed substantially equal to the given speed to move the original past the illuminating area.

6. In an apparatus for making copies of originals on copy material, a copy handling assembly including copy material charging, exposing, and developing stations spaced along a path and copy material feeding means for feeding the copy material along the path, said exposing station including an exposing area, an illuminating station including an illuminating area at which an original is illuminated to provide a light image that is applied to the copy material at the exposing area, a table for receiving an original and mounted for reciprocating movement between normal and displaced positions to move the original past the illuminating area, drive means coupled to the table for reciprocating the table, brake means coupled to the table and normally effective to prevent movement of the table, and a control circuit connected to the copy handling assembly and the drive means and operable to place the drive means in operation to reciprocate the table and the assembly in operation to produce a copy in accordance with the light image produced by the illuminating station, said control circuit including means for releasing the brake means during reciprocation and for causing the brake means to be applied when the table is in the normal position.

7. In an apparatus for making copies of originals on copy material, a copy handling assembly including copy material charging, exposing, and developing stations spaced along a path and copy material feeding means for feeding the copy material along the path, said exposing station including an exposing area, an illuminating station including a lamp and an illuminating area at which an original is illuminated by the lamp to provide a light image that is applied to the copy material at the exposing area.

a table for receiving an original and mounted for reciprocating movement between normal and displaced positions to move the original past the illuminating area, drive means coupled to the table for reciprocating the table, and a control circuit connected to the lamp and the drive means to place the drive means in operation to reciprocate the table and to illuminate the lamp to produce a light image from the original, said control circuit including switch means actuated by the copy material at the exposing station for controlling the drive means to arrest movement away from the normal position and to move the table from its displaced position toward the normal position when the copy material passes the exposing station.

8. The apparatus set forth in claim 7 including a winding means in the control circuit for controlling the coupling of the drive means to the table to move the table from the normal position toward the displaced position, the drive means being so coupled when the winding means is energized.

a potential source in the control circuit, said switch means including first and second contact means, the first contact means being closed as the copy material moves into the exposing station and the second contact means being opened as the copy material leaves the exposing station, and circuit means in the control circuit connecting the potential source in series with the winding means over two parallel paths, one of which includes the first contact means and the other of which includes the second contact means.

9. The apparatus set forth in claim 8 including a pair of normally closed third contact means connected in series between the potential source and the winding means over both of the parallel paths, and means selectively opening the third contact means in dependence on the position of the table.

10. In an apparatus for making copies of originals on copy material, a copy handling assembly including copy material charging exposing, and developing stations spaced along a path and copy material feeding means for feeding the copy material along the path, said exposing station including an exposing area, an illuminating station including a lamp and an illuminating area at which an original is illuminated by the lamp to provide a light image that is applied to the copy material at the exposing area, a table for receiving an original and mounted for reciprocating movement in opposite directions between normal and displaced positions to move the original past the illuminating area, drive means coupled to the table for reciprocating the table, a control circuit connected to the lamp and the drive means to place the drive means in operation to reciprocate the table and to illuminate the lamp to produce a light image from the original, first switch means in the control circuit and controlled by the copy material for controlling the control circuit to terminate the energization of the lamp and start the table moving from a displaced position to the normal position when the copy material has been exposed, and second switch means in the control circuit actuated when the table moves beyond the displaced position in a direction away from the normal position for terminating the illumination of the lamp and for arresting further movement of the table in a direction away from the normal position until the first switch means controls the control circuit to start movement of the table toward the normal position.

11. In an apparatus for making copies of originals on copy material, a copy handling assembly including copy material charging, exposing, and developing stations spaced along a path and copy material feeding means for feeding the copy material along the path, said exposing station including an exposing area, an illuminating station including a lamp and an illuminating area at which an original is illuminated by the lamp to provide a light image that is applied to the copy material at the exposing area, a table for receiving an original and mounted for reciprocating movement in opposite directions between normal and displaced positions to move the original past the illuminating area, drive means coupled to the table for moving the table, a control circuit connected to the drive means for controlling the operation of the drive means to move the table, said control circuit placing the drive means in operation to move the table from the normal position toward a displaced position, first switch means disposed adjacent the path and actuated by the copy material as the copy material passes through the exposure station, said first switch means being connected to the control circuit to control the control circuit to operate the drive means to start the table moving from a displaced position toward then normal position when the copy material passes beyond the exposure station, and second switch means actuated by the table as the table moves to a predetermined position in a direction away from the normal position, said switch means being connected to the control circuit to control the control circuit to stop further movement of the table in a direction away from the normal position by the drive means.

12. The apparatus set forth in claim 11 including means connecting the control circuit to the lamp to control its illumination, the control circuit being controlled by the first switch means to terminate the illumination of the lamp when the copy material leaves the exposure station and by the second switch means to terminate the illumination of the lamp when the table reaches said predetermined position.

13. In an apparatus for making copies of originals on copy material, a copy handling assembly including copy material charging, exposing, and developing stations spaced along a path and copy material feeding means for feeding the copy material along the path, said exposing station including an exposing area, an illuminating station including an illuminating area at which an original is illuminated to provide a light image that is applied to the copy material at the exposing area, a table for receiving an original and mounted for reciprocating movement in opposite directions between normal and displaced positions to move the original past the illuminating area, drive means coupled to the table for reciprocating the table, first switch means controlled by the copy material and actuated when the copy material has been exposed, second switch means operated by the table when the table is displaced from its normal position, and a control circuit including the first and second switch means and connected to the drive means to place the drive means in operation to return the table from a displaced position to a normal position.

14. The apparatus set forth in claim 13 in which the control circuit includes a potential source and a winding which is energized by the potential source to start the return movement of the table by the drive means, and contacts closed under the control of the first and second swtich means are connected in series with the potential source and the winding.

15. In an apparatus for making multiple copies of an original on copy sheet material, a sheet feeding mechanism for feeding sheets of said material, conveyor means for advancing said copy material through the apparatus along a predetermined path, transport means for reciprocally moving the original along a generally horizontal planar path, lens means located between said paths placing the original in optical communication with said copy material, a source of illumination adjacent said transport means, drive means for controlling the movement of said transport means in timed relation with the movement of said copy material, first switch means actuated by said copy material at a predetermined first location along its path for energizing said drive means, second switch means actuated by said copy material for deenergizing said illumination source at a second location downstream of said first location, and third switch means in the path of said transport means and actuated thereby for operating said sheet feeding mechanism for each reciprocation of said transport means and synchronizing the movement of said copy material with said transport means.

References Cited

UNITED STATES PATENTS 2,703,280   3/1955   Butterfield _____ 95—1.7

JOHN M. HORAN, *Primary Examiner.*

U.S. Cl. X.R.

355—3, 14